United States Patent [19]

Nishimoto et al.

[11] Patent Number: 5,687,265

[45] Date of Patent: Nov. 11, 1997

[54] OPTICAL CONTROL DEVICE AND METHOD FOR MAKING THE SAME

[75] Inventors: Hiroshi Nishimoto; Toshiyuki Kambe, both of Tokyo, Japan

[73] Assignee: NEC Corporation, Tokyo, Japan

[21] Appl. No.: 535,477

[22] Filed: Sep. 27, 1995

[30] Foreign Application Priority Data

Sep. 27, 1994 [JP] Japan ................................. 6-231754
Nov. 28, 1994 [JP] Japan ................................. 6-292625

[51] Int. Cl.$^6$ ................................. G02B 6/26; G02B 6/42
[52] U.S. Cl. ................................. 385/40; 385/2; 385/8; 385/9
[58] Field of Search ................................. 385/2, 8, 9, 14, 385/40, 132

[56] References Cited

U.S. PATENT DOCUMENTS

| | | | |
|---|---|---|---|
| 4,561,718 | 12/1985 | Nelson | 385/132 |
| 5,042,895 | 8/1991 | Chouinard et al. | 385/132 |
| 5,390,157 | 2/1995 | Revelli | 385/14 |
| 5,404,412 | 4/1995 | Seino et al. | 385/132 |

FOREIGN PATENT DOCUMENTS

| | | |
|---|---|---|
| 63-96626 | 4/1988 | Japan . |
| 1-155631 | 6/1989 | Japan . |
| 4-195115 | 7/1992 | Japan . |
| 5-66428 | 3/1993 | Japan . |
| 5-113513 | 5/1993 | Japan . |
| 6-075195 | 3/1994 | Japan . |

OTHER PUBLICATIONS

N. Nishimoto et al., "Polarization Independent 8X8 LiNbO$_3$ Optical Matrix Switch", Electronic Information Communication Society, OQE88–147, pp. 67–74, in Japanese.

*Primary Examiner*—Rodney B. Bovernick
*Assistant Examiner*—Robert E. Wise
*Attorney, Agent, or Firm*—Young & Thompson

[57] ABSTRACT

Disclosed is an optical control device which has a LiNbO3 or LiTaO3 crystalline substrate having electrooptic effect; a channel-type optical waveguide which is formed in the crystalline substrate by doping metal; an optically transparent film layer formed on the crystalline substrate; and electrodes formed on the optically transparent film layer; wherein the crystalline substrate has a surface except a region which waveguided-light through the channel-type optical waveguide propagates or an entire surface under which a layer doped by metal is formed.

18 Claims, 12 Drawing Sheets

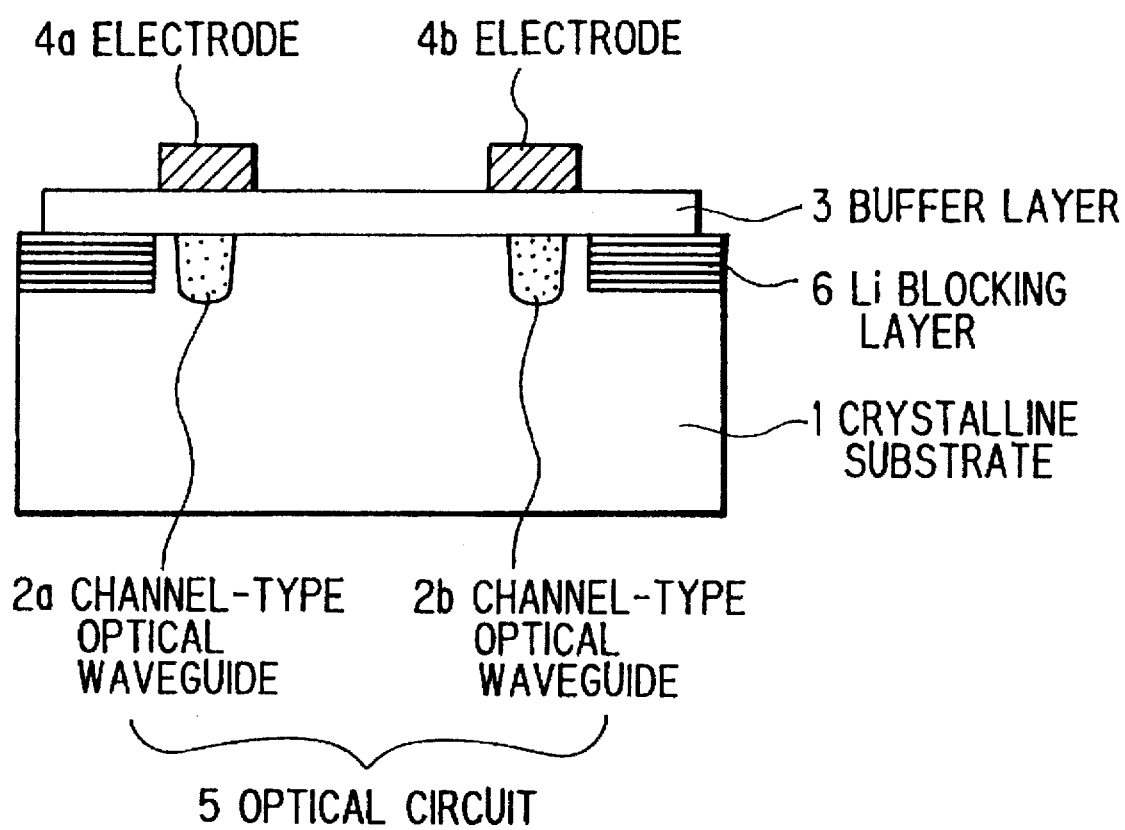

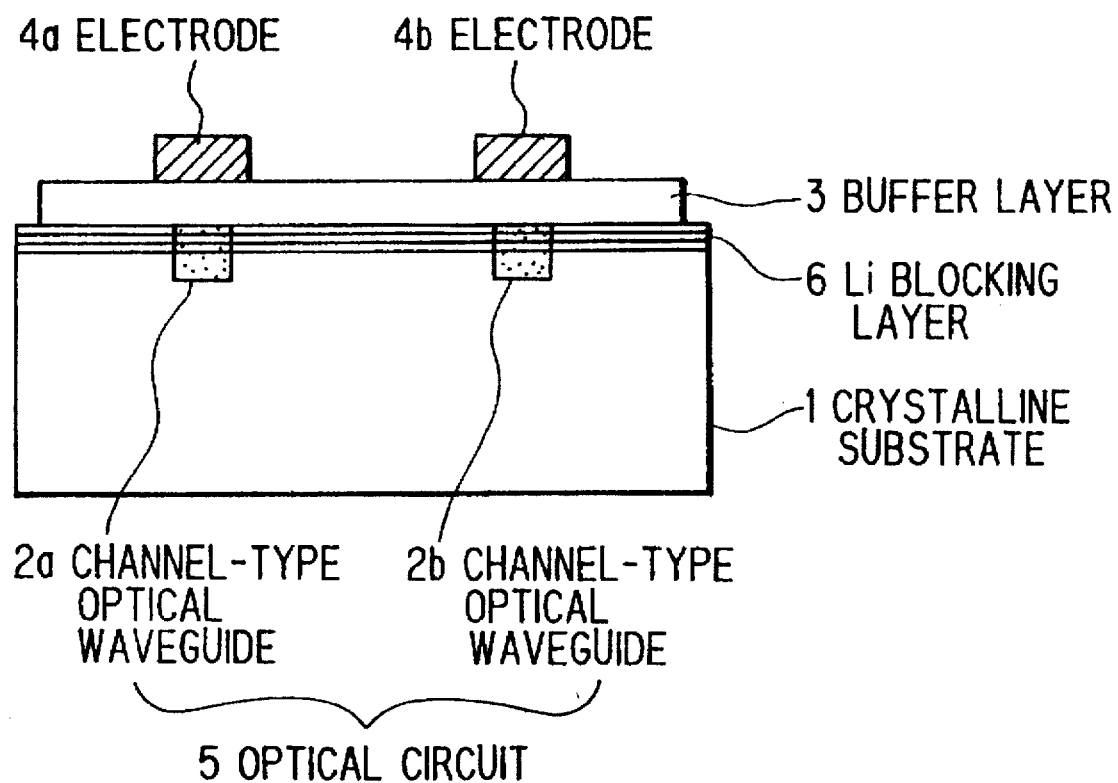

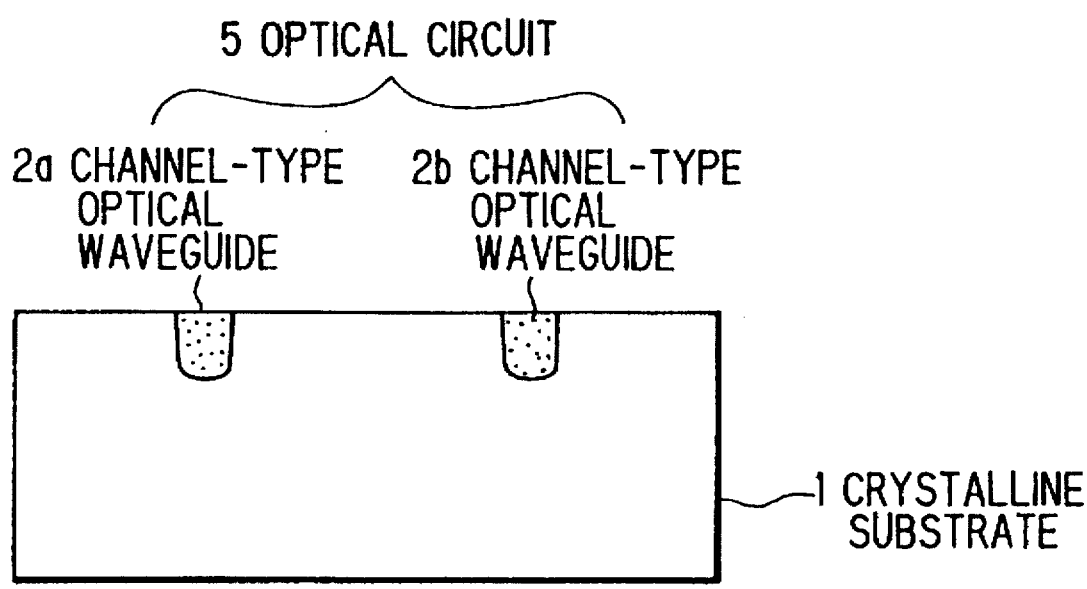
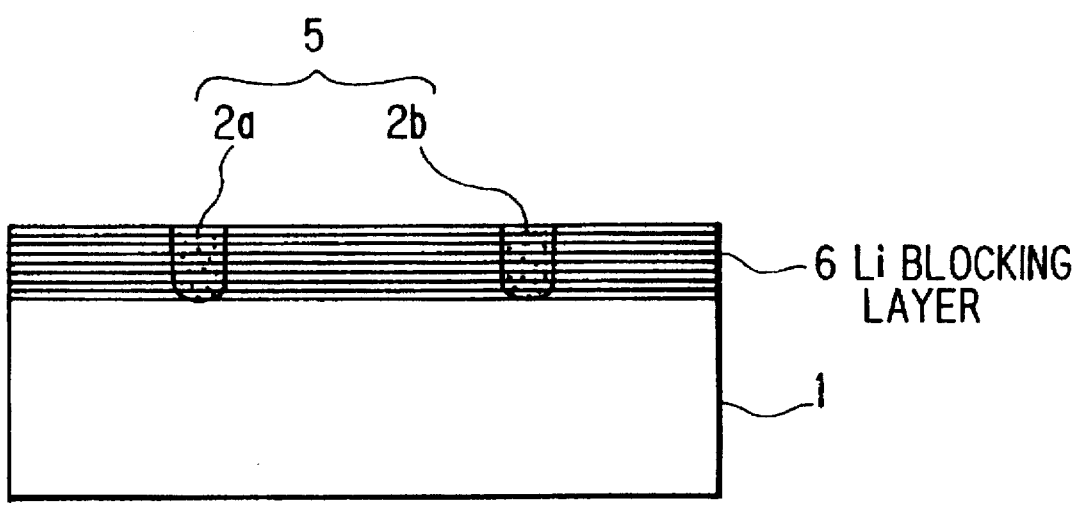

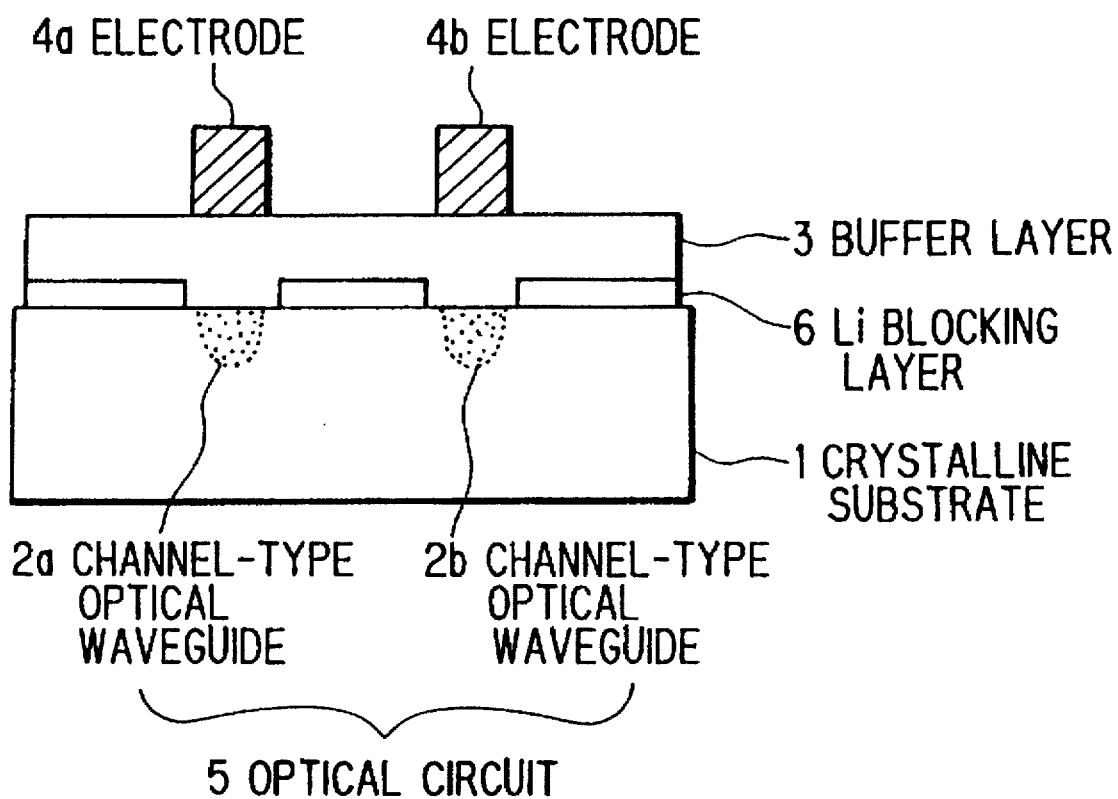

OPTICAL CONTROL DEVICE AND METHOD FOR MAKING THE SAME

FIELD OF THE INVENTION

This invention relates to an optical control device for switching light paths, modulating a light wave and filtering a light wavelength, and more particularly to, an optical control device of a waveguide type in which the control is carried out by using optical waveguides which is formed on an electrooptic effect crystalline substrate made of lithium-containing material such as LiNbO3, LiTaO3 or the like, and method for making the same.

BACKGROUND OF THE INVENTION

Along with the utilization of an optical communication system, a large capacity and multi-function system is desired. Also, enhanced functions such as high-speed generation of optical signal, high-speed switching of optical transmission line, high-speed exchanging are required.

As a means for switching optical transmission lines and exchanging in a network, an optical switch is used. The optical switch now available is operated by switching light paths according to the mechanical movement of a prism, mirror, fiber or the like. However, it has problems in that the operating speed is low and that it is too large to construct a matrix switch. To overcome the problems, a waveguide-type optical switch which employs optical waveguides has been developed. It has advantages in that high-speed operation, integration of numerous elements and high reliability can be realized. In particular, the optical switch which employs a ferroelectric material such as lithium niobate (LiNbO3) or the like has low light absorption and high efficiency caused by the large electrooptic effect. Various types of optical control devices are reported, for example, a directional-coupler type, mach-zender type, balance-bridge type, total-reflection type optical switch.

Recently, the high-density integration of the waveguide-type optical switch using a directional coupler which is formed in an electrooptic effect LiNbO3 crystalline substrate has been developed. H. Nishimoto (the inventor of this application) et al., "Polarization Independent 8×8 LiNbO3 Optical Matrix Switch", Electronic Information Communication Society, OQE88–147, pp. 67–74 reports the 8×8 matrix optical switch in which 64 directional-coupler type optical switches is integrated in the LiNbO3 crystalline substrate. Also, a device such as an external optical modulator which comprises a single optical switch has been developed.

The characteristics concerning such waveguide-type devices are stability in operation, switching voltage(power), crosstalk, extinction ratio, loss, switching speed and so on. Most important characteristic of these is stability in operation.

However, the conventional optical control device has a problem of DC drift which significantly affects stability in operation and reliability of the device. The DC drift is a phenomenon that an optical-output to applied-voltage characteristic shifts while a DC voltage is continuously applied.

SUMMARY OF THE INVENTION

Accordingly, it is an object of the invention to provide an optical control device in which the DC drift can be effectively suppressed to afford high reliability.

It is a further object of the invention to provide a method for making an optical control device in which the DC drift can be effectively suppressed to afford high reliability.

According to the invention, an optical control device, comprises:

a LiNbO3 or LiTaO3 crystalline substrate having electrooptic effect;

a channel-type optical waveguide which is formed in the crystalline substrate by doping metal;

an optically transparent film layer formed on the crystalline substrate; and electrodes formed on the optically transparent film layer;

wherein the crystalline substrate has a surface except a region which waveguided-light through the channel-type optical waveguide propagates or an entire surface under which a layer doped by metal is formed.

According to another aspect of the invention, an optical control device, comprises:

a LiNbO3 or LiTaO3 crystalline substrate having electrooptic effect;

a channel-type optical waveguide which is formed in the crystalline substrate by proton exchange;

an optically transparent film layer formed on the crystalline substrate; and electrodes formed on the optically transparent film layer;

wherein the crystalline substrate has a partial surface except a region where waveguided-light through the channel-type optical waveguide propagates or an entire surface under which a layer doped by metal is formed.

According to another aspect of the invention, a method for making an optical control device, comprises the steps of:

preparing a LiNbO3 crystalline substrate; and forming simultaneously a channel-type optical waveguide which is formed in the crystalline substrate by doping metal and a layer under a partial surface except a region where waveguided-light through the channel-type optical waveguide propagates or an entire surface of the crystalline substrate, the layer being formed by doping metal, with applying a thermal diffusion.

According to another aspect of the invention, a method for making an optical control device, comprises the steps of:

preparing a LiNbO3 crystalline substrate; and forming a channel-type optical waveguide which is formed in the crystalline substrate by doping metal and a layer under a partial surface except a region where waveguided-light through the channel-type optical waveguide propagates or an entire surface of the crystalline substrate, the layer being formed by doping metal, with separately applying a thermal diffusion to each of the channel-type optical waveguide and the layer.

According to another aspect of the invention, an optical control device, comprises:

a crystalline substrate having electrooptic effect which is made of a lithium-containing material;

a channel-type optical waveguide which is formed in the crystalline substrate;

a first film layer which is optically transparent and formed on the crystalline substrate;

a second film layer which is formed between the crystalline substrate and the first film layer and is positioned at a partial or entire region except a region where waveguided-light through the channel-type optical waveguide propagates, the second film layer is made of a material different from that of the crystalline substrate and the first film layer; and electrodes formed on the first film layer.

According to another aspect of the invention, a method for making an optical control device, comprises the steps of:

preparing a crystalline substrate having electrooptic effect which is made of a lithium-containing material;

forming a channel-type optical waveguide in the crystalline substrate;

forming a first film layer on the crystalline substrate so that the first film layer is positioned at a partial or entire region except a region where waveguided-light through the channel-type optical waveguide propagates; and forming a second film layer which is optically transparent on the second film layer.

According to another aspect of the invention, a method for making an optical control device, comprises the steps of:

preparing a crystalline substrate having electrooptic effect which is made of a lithium-containing material;

forming a channel-type optical waveguide in the crystalline substrate;

forming a first film layer on the crystalline substrate;

forming a second film layer which is optically transparent on the second film layer; and removing at least a part of the first and second film layer over a region where waveguided-light through the channel-type optical waveguide propagates.

Namely, the invention is based on the inventor's finding that lithium which is a component of the crystalline substrate is mixed from the LiNbO3 or LiTaO3 crystalline substrate into the buffer layer of SiO2 or the like due to plasma or heat when the buffer layer is deposited by CVD method, sputtering method, vapor deposition method of the like.

In accordance with the invention, by forming a lithium blocking layer under or over a surface of the crystalline substrate except a region where waveguided-light through the channel-type optical waveguide propagates, the mixing of lithium into the buffer layer can significantly be reduced as compared with the conventional device that the lithium blocking layer is not formed.

BRIEF DESCRIPTION OF THE DRAWINGS

The invention will be explained in more detail in conjunction with the appended drawings, wherein:

FIG. 4 is a cross sectional view showing an optical control device in a second preferred embodiment according to the invention, FIG. 5 is a cross sectional view showing an optical control device in a third preferred embodiment according to the invention, FIGS. 7A and 7B are cross sectional views showing another process for making an optical control device according to the invention, FIG. 10 is a cross sectional view showing an optical control device in a sixth preferred embodiment according to the invention.

DESCRIPTION OF THE PREFERRED EMBODIMENTS

Before explaining an optical control device in the preferred embodiment, the aforementioned conventional optical control device will be explained in FIG. 1.

Figure 1:
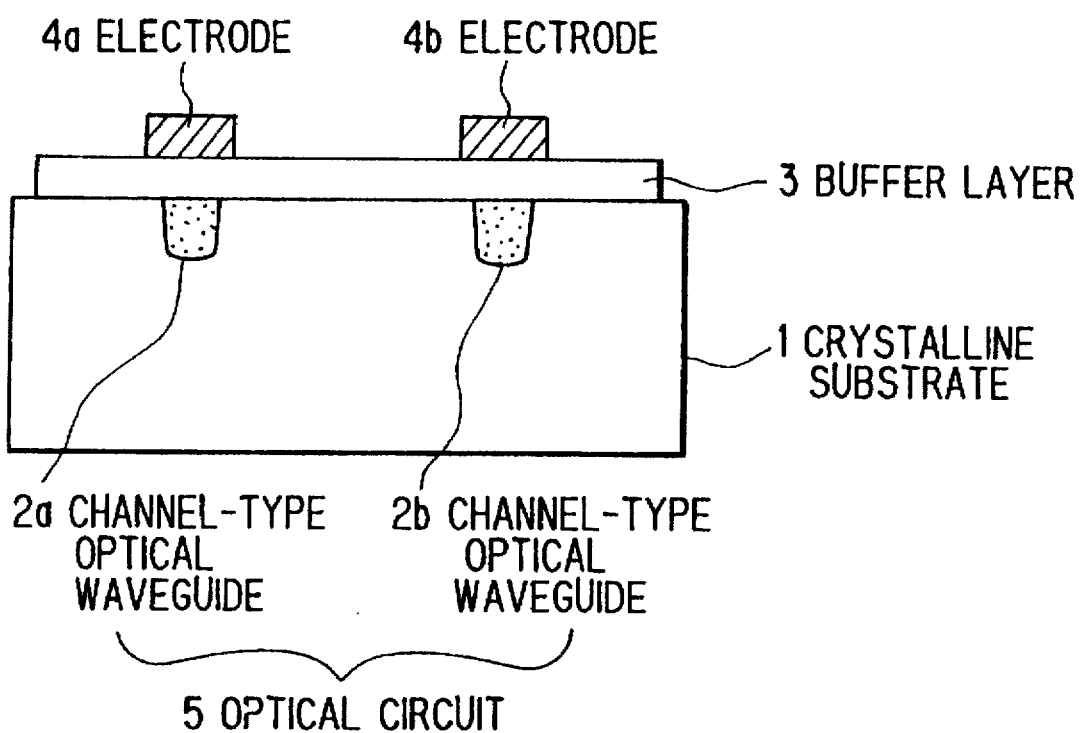
FIG. 1 is a cross sectional view showing a conventional optical control device.

As shown in FIG. 1, the conventional optical control device comprises an electrooptic crystalline substrate 1 which is made of LiNbO3, LiTaO3 or the like and in which channel-type optical waveguides 2a and 2b form a directional coupler 5, a buffer layer 3 formed on the electrooptic crystalline substrate 1 and metal electrodes 4a and 4b to which external control signals are applied.

The buffer layer 3 of optically transparent film is used as an optical buffer layer to prevent the absorption of the waveguided-light caused by the metal electrodes 4a and 4b. It is generally made of SiO2 since SiO2 does not absorb light and has a refractive index significantly less than that of LiNbO3 or LiTaO3 substrate. The electrodes 4a and 4b generally employ a metal with low volume resistivity so as to provide high-speed operation and are disposed near the channel-type optical waveguides 2a and 2b.

The optical control devices of optical waveguide type having the above structure, such as an optical switch or optical modulator, have been suggested. However, they can not yet be put to practice since there is an open question of DC drift which affects reliability of the device. DC drift is a phenomenon that an optical-output to applied-voltage characteristic shifts while a DC voltage is continuously applied. DC drift is caused by the impurity ions which are included in the buffer layer 3 which are deposited on the electrooptic crystalline substrate 1 by the CVD or sputtering method. Namely, the impurity ions may move according to the polarity thereof under the electric field in the buffer layer 3 which is generated by the voltage applied to the electrodes 4a and 4b. Due to the movement of ions, the anti-electric-field which negates the electric field in the buffer layer 3 is formed. This phenomenon is a cause of DC drift. The impurity ions contributory to DC drift include sodium or potassium which is mixed from nature, as well as lithium mixed in the buffer layer 3 from the LiNbO3 or LiTaO3 substrate. The mixing of lithium from the LiNbO3 or LiTaO3 substrate is promoted by plasma or heat generated in the deposition by the CVD or sputtering method.

Figure 2:
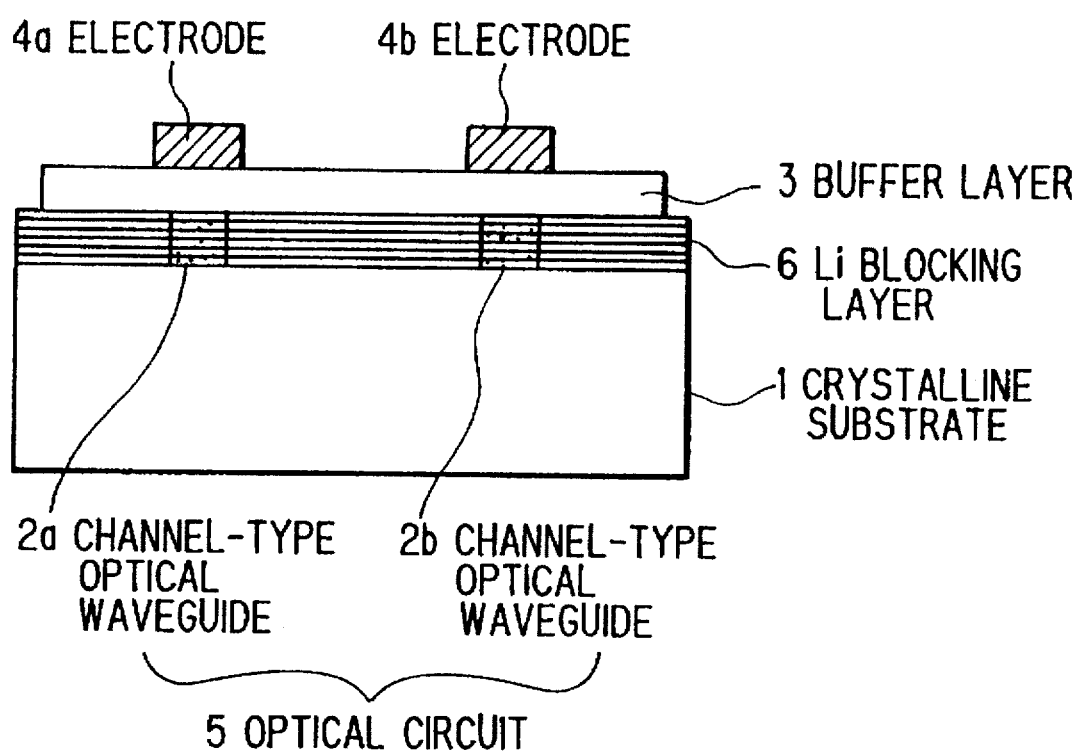
FIG. 2 is a cross sectional view showing an optical control device in a first preferred embodiment according to the invention.

Next, an optical control device in the first preferred embodiment will be explained in FIG. 2, wherein like parts are indicated by like reference numerals as used in FIG. 1.

The optical control device in the first embodiment is provided with an optical circuit 5 which has two channel-type optical waveguides 2a and 2b, and electrodes 4a and 4b which are formed on a buffer layer 3 of optically transparent film and are disposed over the channel-type optical waveguides 2a and 2b. Herein, the optical circuit 5 may employ a directional-coupler type, mach-zender type, balance-bridge type or the like. The buffer layer 3 is preferably made of SiO2, and it also may be made of Al2O3, MgF2, Si3N4 or the like. The depositing of the buffer layer 3 may be performed by the CVD method, sputtering method, vapor deposition method or the like. The electrodes 4a and 4b may be made of various conductive materials such as Au, Al, Mo, Cu, WSi, ITO, ZnO or conductive polymer.

Further, in FIG. 2, a metal-doped layer 6 (hereinafter referred to as "lithium blocking layer") is on the entire surface of the LiNbO3 crystalline substrate 1, as well as the channel-type optical waveguides 2a and 2b made by doping metal into parts of the surface of the LiNbO3 crystalline substrate 1. The doping metal for forming the channel-type optical waveguides 2a and 2b and lithium blocking layer 6 may include Ti, Cu, V, Fe, Mo, Cr or the like. The doping of metal may be performed by the thermal diffusion method, ion implantation method or the like. Herein, the doping of metal should be performed such that the refractive index of the channel-type optical waveguides 2a and 2b is greater than that of the lithium blocking layer 6.

Both the channel-type optical waveguides 2a and 2b and lithium blocking layer 6 in the first embodiment are formed by doping titanium by the thermal diffusion method. Herein, the doping of titanium is performed such that the refractive index of the channel-type optical waveguides 2a and 2b is greater than that of the lithium blocking layer 6. In this embodiment, based on the fact that the refractive index increases with thickening the titanium-deposited layer, the titanium-deposited layer for the channel-type optical waveguides 2a and 2b is formed to be thicker than that for the lithium blocking layer 6 to obtain a desired difference in refractive index. Namely, the titanium-deposited layer for the channel-type optical waveguides 2a and 2b has a thickness of 0.05 to 0.15 nm, while the titanium-deposited layer for the lithium blocking layer 6 has a thickness of 1/100 to 4/5 of the thickness of the titanium-deposited layer for the channel-type optical waveguides 2a and 2b. Then, both the titanium-deposited layers are processed by the thermal diffusion at 850° to 1100° C. for 0.5 to 20 hours to form the channel-type optical waveguides 2a and 2b and lithium blocking layer 6.

The inventor has found that lithium which is a component of the crystalline substrate 1 is mixed with the LiNbO3 or LiTaO3 crystalline substrate 1 into the buffer layer 3 of SiO2 or the like due to plasma or heat when the buffer layer 3 is deposited by CVD method, sputtering method, vapor deposition method or the like. Furthermore, he has found that the mixing of lithium is significantly reduced a the region where the lithium blocking layer 6 is formed as compared with at the region where the lithium blocking layer 6 is not formed.

Figure 3:
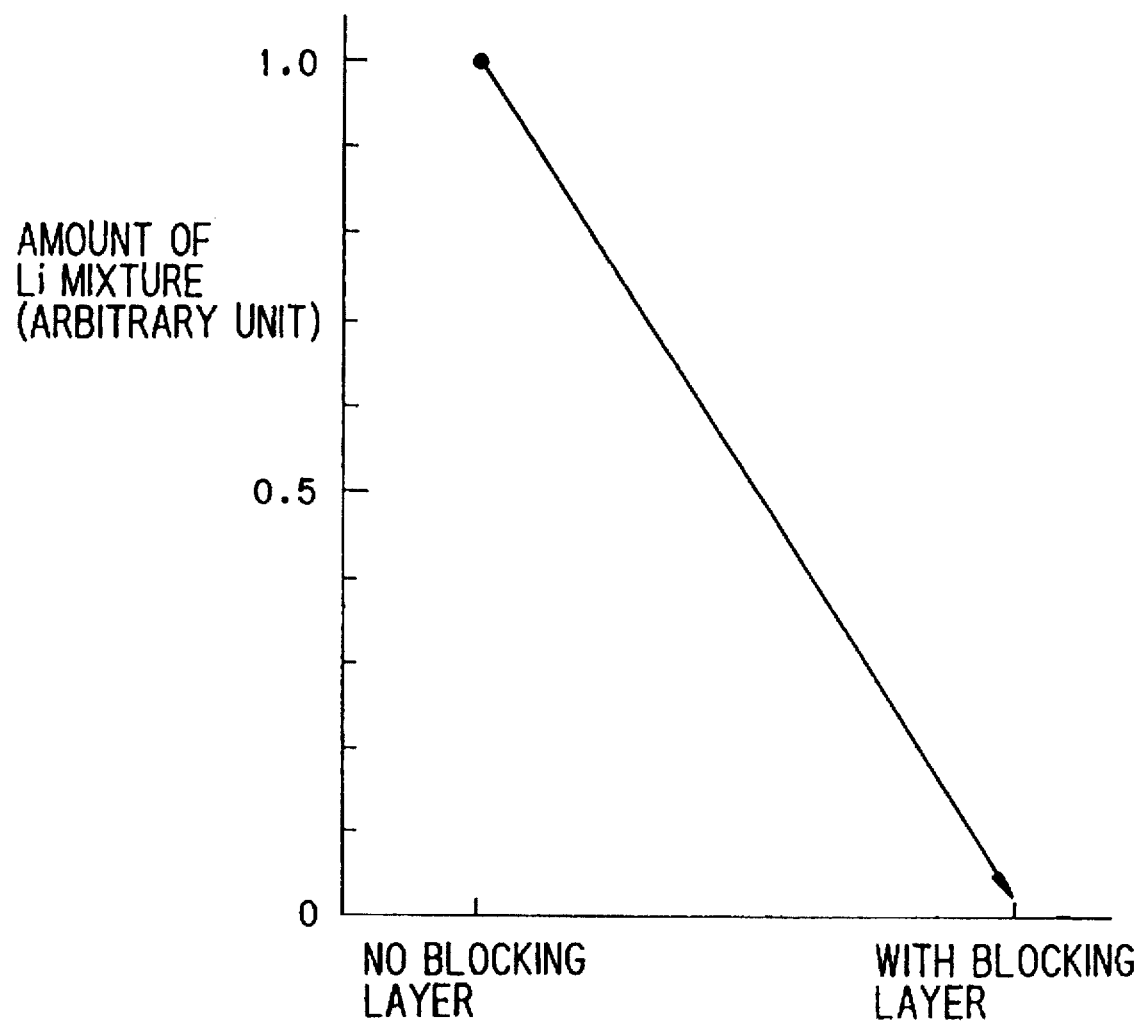
FIG. 3 is a graph showing an amount of lithium mixture into a buffer layer depending on the existence of a lithium blocking layer.

FIG. 3 shows an amount of lithium mixture into the SiO2 buffer layer 3 depending on the existence of the lithium blocking layer 6, i.e., on the right end point of the horizontal axis, the lithium blocking layer is formed on the surface of the LiNbO3 crystalline substrate 1; on the left end point of the horizontal axis, the lithium blocking layer is not formed on the surface of the LiNbO3 crystalline substrate 1. The SiO2 buffer layer 3 is formed by the sputtering method. Due to the lithium blocking layer 6, the amount of lithium mixture into the SiO2 buffer layer is reduced to about 1/50.

Thus, according to the optical control device in the first embodiment, the lithium mixture from the LiNbO3 crystalline substrate 1 into the SiO2 buffer layer 3 due to plasma or heat when the SiO2 buffer layer 3 is deposited by CVD method, sputtering method, vapor deposition method or the like can be effectively reduced. Thereby, DC drift of the device can be suppressed to provide an optical control device with high reliability.

Meanwhile, it will be easily appreciated that the above optical control device can be obtained if only the amount and depth of metal doped is set such that the channel-type optical waveguides 2a and 2b serve as a waveguide, i.e., the amount, depth and type of metal doped are not limited by the other condition.

With reference to FIG. 4, an optical control device in the second preferred embodiment will be explained. In this embodiment, an optical circuit 5 is a directional coupler, and a lithium blocking layer 6 is formed on the surface of a crystalline substrate 1 except the region where the waveguided-light through channel-type optical waveguides 2a and 2b propagates. The lithium blocking layer 6 is not formed at the region between the channel-type optical waveguides 2a and 2b of the directional coupler, since the waveguided-light propagates therebetween. The second embodiment can provide a similar advantage to that of the first embodiment. In addition, the optical control device in the second embodiment does not affect the propagation characteristic of the waveguided-light through the channel-type optical waveguides 2a and 2b. Therefore, reduction of the steps in processing and designing of the device, and a higher yield can be realized.

With reference to FIG. 5, an optical control device in the third preferred embodiment will be explained. In this embodiment, channel-type optical waveguides 2a and 2b are formed on the surface of a LiTaO3 crystalline substrate 1 by proton exchanging, and a lithium blocking layer 6 is formed by doping metal on the entire surface of the LiTaO3 crystalline substrate 1. The proton exchanging for forming the channel-type optical waveguides 2a and 2b may employ benzoic acid, pyrophosphoric acid or the like. When the crystalline substrate 1 is made of LiTaO3, the lithium blocking layer 6 is doped by ion implantation. When the crystalline substrate 1 is made of LiNbO3, the lithium blocking layer 6 is doped by thermal diffusion or ion implantation. The doping metal for forming the lithium blocking layer 6 may include Ti, Cu, V, Fe, Mo, Cr or the like. The third embodiment can also provide a similar advantage to that of the first embodiment.

Meanwhile, it will be easily appreciated that the above optical control device can be obtained if only the proton exchanging and the metal doping into the lithium blocking layer 6 are performed such that the channel-type optical waveguides 2a and 2b serve as a waveguide, i.e., the amount and depth of the proton exchanging, and the amount, depth and type of metal doped are not limited by the other condition.

Figure 6A:
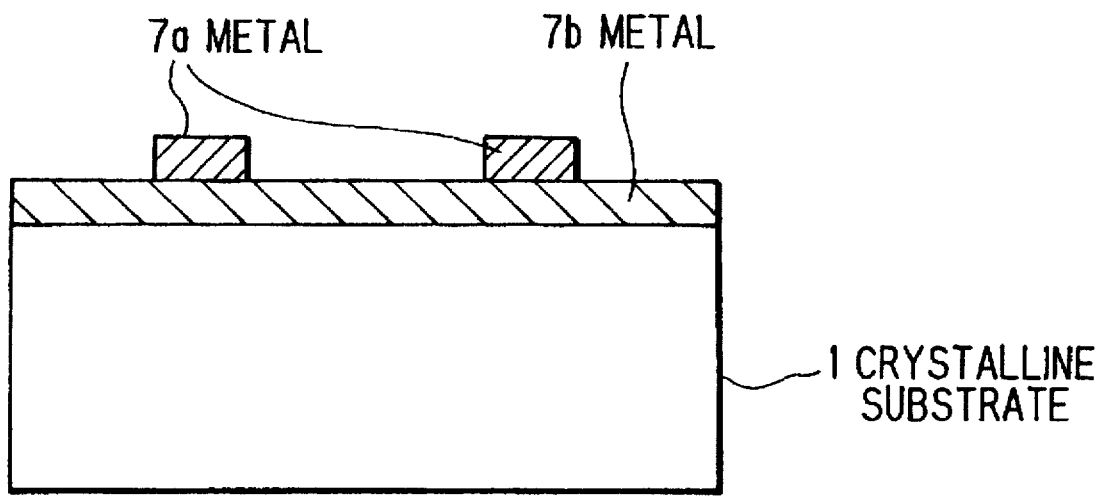
FIGS. 6A and 6B are cross sectional views showing a process for making an optical control device according to the invention.
Figure 6B:
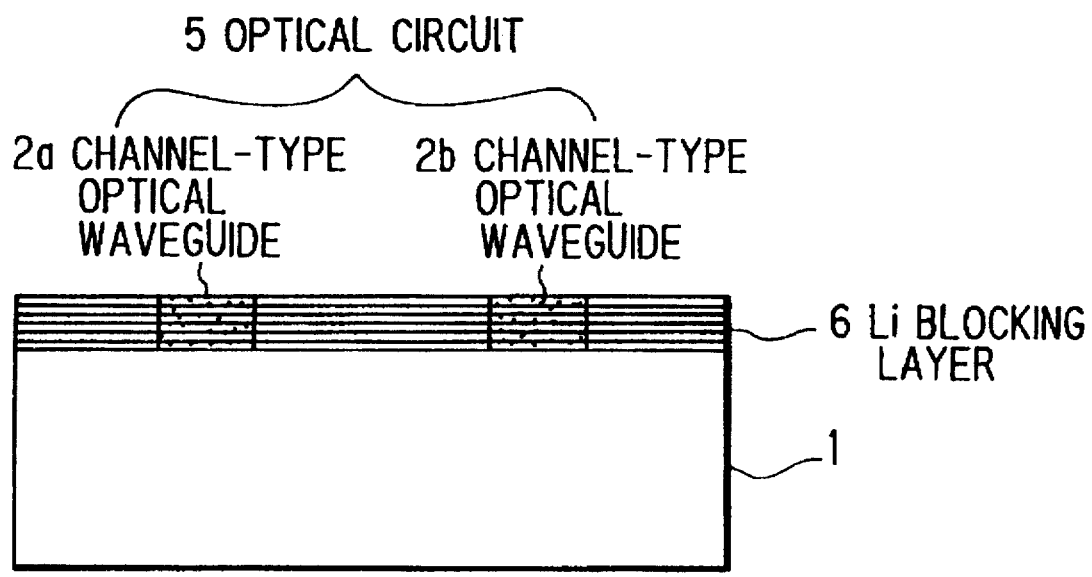

FIGS. 6A and 6B show the process for making an optical control device in the first preferred embodiment according to the invention.

First, on a LiNbO3 crystalline substrate 1, a patterned metal layer 7a for forming channel-type optical waveguides 2a and 2b and a metal layer 7b for forming a lithium blocking layer 6 are formed (FIG. 6A). The depositing of the metal layers 7a and 7b may be performed by CVD, sputtering, vapor deposition method or the like. The patterning of the metal layer 7a is by the standard lithography technique. Herein, the metal layer 7b for the lithium blocking layer 6 may be patterned such that the region for propagating waveguided-light without the lithium blocking layer is left.

Next, by doping the metal in the metal layers 7a and 7b into the LiNbO3 crystalline substrate 1 by thermal diffusion, the channel-type optical waveguides 2a and 2b and lithium blocking layer 6 are simultaneously formed (FIG. 6B).

Though the patterned metal layer 7a for forming the channel-type optical waveguides 2a and 2b is mounted on the metal layer 7b for forming the lithium blocking layer 6 in FIG. 6A, it will be easily appreciated that the relationship in the mounting can be changed upside down, i.e., the metal layer 7b may be mounted on the metal layer 7a.

The doping metal may include Ti, Cu, V, Fe, Mo, Cr or the like. In this embodiment, both the channel-type optical waveguides 2a and 2b and lithium blocking layer 6 are formed by using titanium as the doping metal.

FIGS. 7A and 7B show the process for making an optical control device in the second preferred embodiment according to the invention. First, after depositing a metal layer 7a for forming channel-type optical waveguides 2a and 2b as shown in FIG. 6A on the LiNbO3 crystalline substrate 1, the metal layer 7a is processed by the thermal diffusion to form the channel-type optical waveguides 2a and 2b (FIG. 7A). Next, after depositing a metal layer 7b for forming a lithium blocking layer 6 as shown in FIG. 6A on the LiNbO3 crystalline substrate 1, the metal layer 7b is processed by thermal diffusion to form the lithium blocking layer 6 (FIG. 7B). Herein, the metal layer 7b for the lithium blocking layer 6 may be patterned such that the region for propagating waveguided-light without the lithium blocking layer is left.

Similarly to the process in the first embodiment, the depositing of the metal layers 7a and 7b may be performed by CVD, sputtering, vapor deposition method or the like. The patterning of the metal layer 7a is by the standard lithography technique.

Though, in this embodiment, the lithium blocking layer 6 is formed after the formation of the channel-type optical waveguides 2a and 2b, the lithium blocking layer 6 can be formed before the formation of the channel-type optical waveguides 2a and 2b.

Meanwhile, it will be easily appreciated that the above optical control device can be obtained if only the channel-type optical waveguides 2a and 2b serve as a waveguide, i.e., the relationship in depth between the channel-type optical waveguides 2a and 2b and the lithium blocking layer 6 is not limited by the other condition.

The doping metal may include Ti, Cu, V, Fe, Mo, Cr or the like. In this embodiment, both the channel-type optical waveguides 2a and 2b and lithium blocking layer 6 are formed by using titanium as the doping metal.

Figure 8:
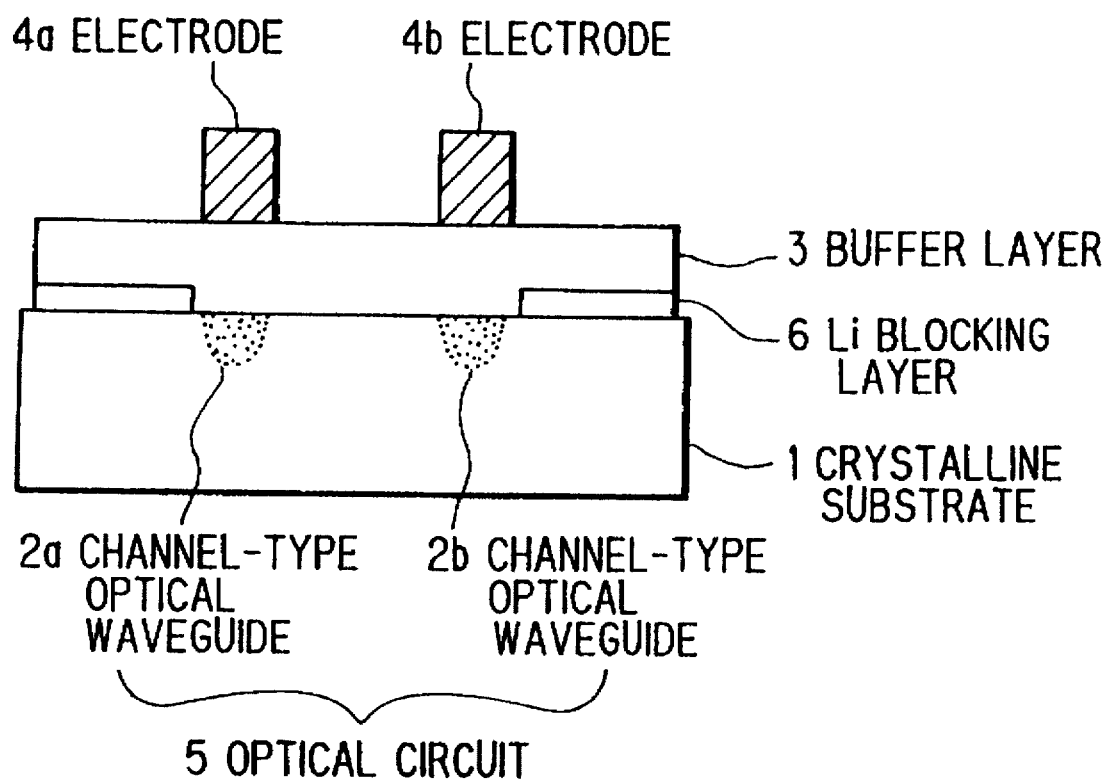
FIG. 8 is a cross sectional view showing an optical control device in a fourth preferred embodiment according to the invention.

With reference to FIG. 8, an optical control device in the fourth preferred embodiment will be explained.

The optical control device in the fourth embodiment is provided with an optical circuit 5 which has two channel-type optical waveguides 2a and 2b which are formed on a LiNbO3 crystalline substrate 1 by the thermal diffusion method, and electrodes 4a and 4b which are formed on a buffer layer 3 of optically transparent film and are disposed over the channel-type optical waveguides 2a and 2b. Herein, the optical circuit 5 may employ a directional-coupler type, mach-zender type, balance-bridge type or the like. The buffer layer 3 is preferably made of SiO2, and it also may be made of Al2O3, MgF2, SiON, Si3N4 or the like. The depositing of the buffer layer 3 may be performed by the CVD method, sputtering method, vapor deposition method or the like. The electrodes 4a and 4b may be made of various conductive materials such as Au, Al, Mo, Cu, WSi, ITO, ZnO or conductive polymer.

Between the LiNbO3 crystalline substrate 1 and the buffer layer 3, a film layer 6 (hereinafter referred to as "lithium blocking layer") which is separated from the buffer layer 3 is provided. Herein, the lithium blocking layer 6 is not formed in the region for propagating waveguided-light. Thus, when the optical circuit 5 employs a directional coupler or X-type, the lithium blocking layer 6, as shown in FIG. 8, is not formed on the channel-type optical waveguides 2a and 2b nor between the channel-type optical waveguides 2a and 2b.

The lithium blocking layer 6 may be made of a metal or semiconductor material of a single element including Su, Ti, Cu, V, Fe, Mo, Cr or the like, or a dielectric, metal, semiconductor, organic material or the like which is difficult to generate the ionic polarization in applying an electric field, such as crystal doped by phosphorus, MgF2, Si3N4, GaAs, InP, polyimide.

The substrate 1 is limited to the LiNbO3 crystalline substrate, and any lithium-containing crystalline substrate such as a LiTaO3 crystalline substrate may be used.

The depositing of the lithium blocking layer 6 may be performed by CVD, sputtering, vapor deposition method or the like. The standard lithography technique is employed to preclude the formation of the lithium blocking layer at the region for propagating waveguided-light.

A titanium-deposited layer with a thickness of 0.02 to 0.15 nm is processed by the thermal diffusion at 850° to 110° C. for 0.5 to 20 hours to form the channel-type optical waveguides 2a and 2b.

Figure 9:
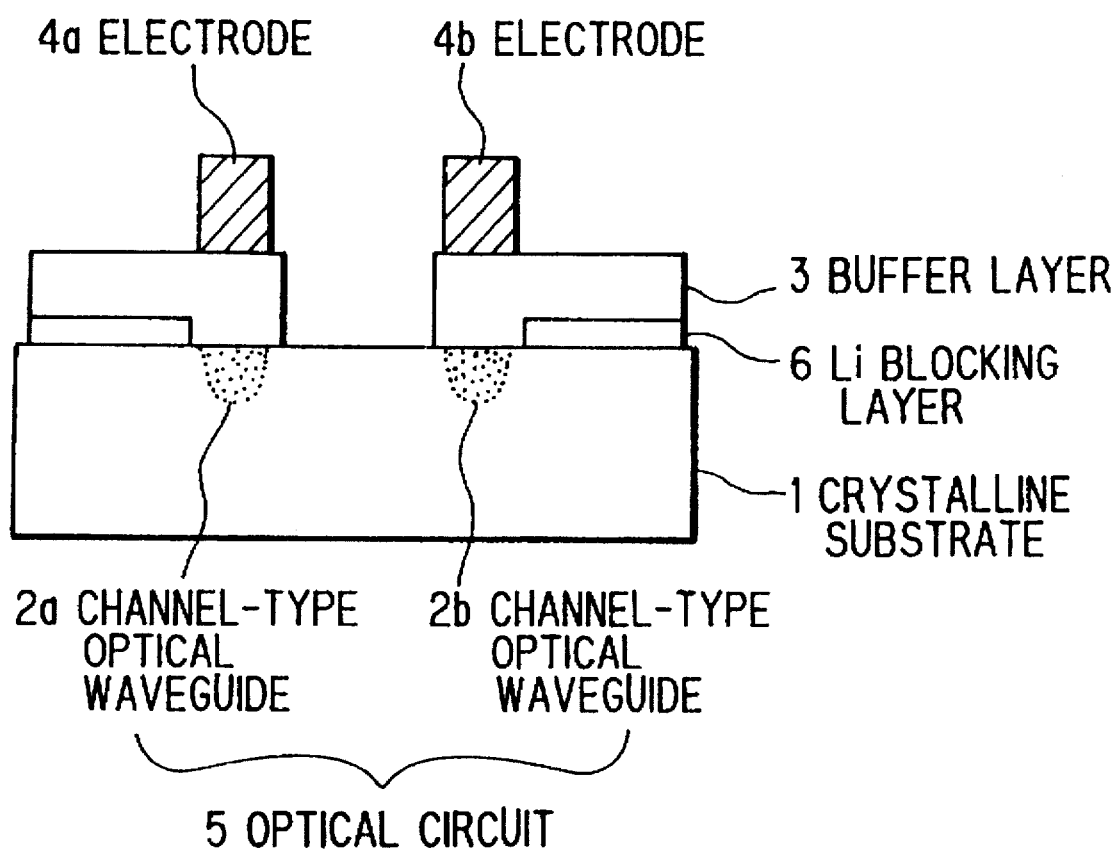
FIG. 9 is a cross sectional view showing an optical control device in a fifth preferred embodiment according to the invention.

With reference to FIG. 9, an optical control device in the fifth preferred embodiment will be explained.

In this embodiment, on the intermediate step in the process for making the optical control device, a lithium blocking layer 6 and buffer layer 3 between two channel-type optical waveguides 2a and 2b is partially removed. This structure is suitable for the case that the lithium blocking layer 6 between the channel-type optical waveguides 2a and 2b is not proper, i.e., when the optical circuit 5 is a directional coupler, X-type or the like. Because the covering area of the lithium blocking layer 6 is greater than that of the lithium blocking layer 6 in the fourth embodiment, the lithium mixture into the buffer layer 3 when the buffer layer 3 is deposited can be more reduced to further suppress DC drift and provide an optical control device with higher reliability.

With reference to FIG. 10, an optical control device in the sixth preferred embodiment will be explained.

This embodiment is suitable for the case that the optical circuit 5 in which waveguided-light does not propagate between two channel-type optical waveguides 2a and 2b, such as a mach-zender type, balance-bridge type is employed. Namely, a lithium blocking layer 6 is also formed between the channel-type optical waveguides 2a and 2b. Because the covering area of the lithium blocking layer 6 is greater than that of the lithium blocking layer 6 in the fourth embodiment, the lithium mixture into the buffer layer 3 when the buffer layer 3 is deposited can be more reduced to further suppress DC drift and provide an optical control device with higher reliability.

Figure 11A:
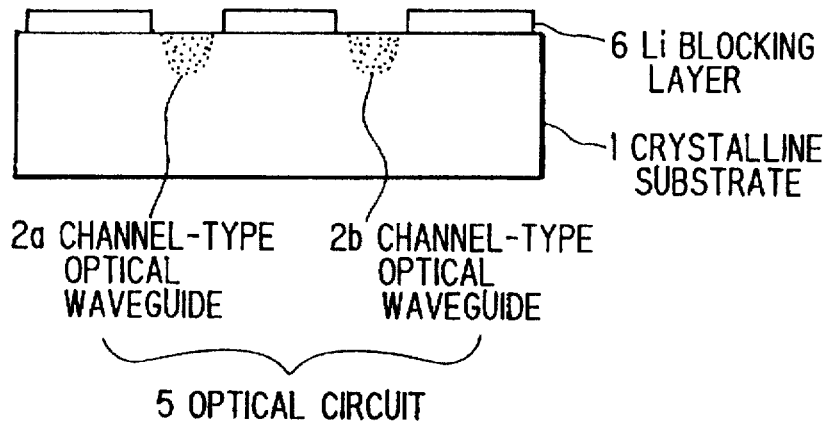
FIGS. 11A to 11C are cross sectional views showing a process for making the optical control device in the fifth embodiment according to the invention.
Figure 11B:
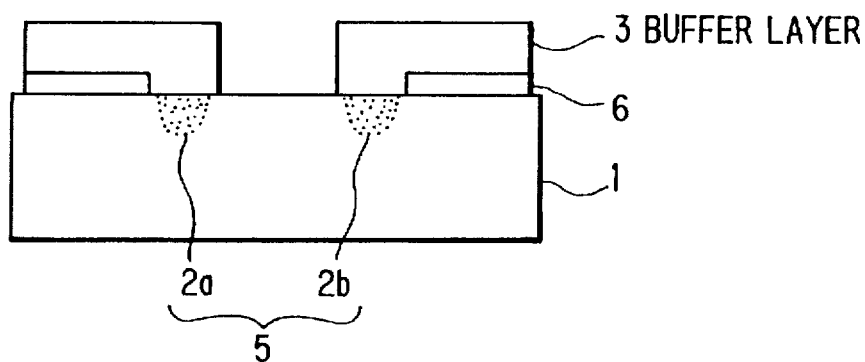
Figure 11C:
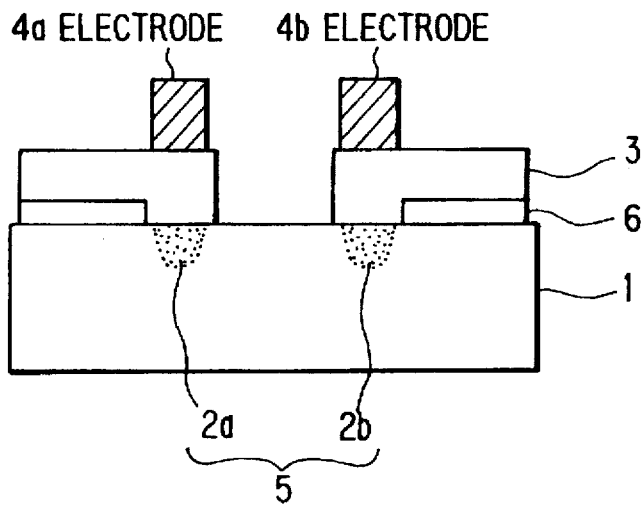

FIGS. 11A to 11C show the process for making the optical device in the fifth embodiment.

First, as shown in FIG. 11A, after forming the directional coupler 5 of the channel-type optical waveguides 2a and 2b on the LiNbO3 crystalline substrate 1 by the thermal diffusion of titanium, the lithium blocking layer 6 is deposited on the LiNbO3 crystalline substrate 1 except on the channel-type optical waveguides 2a and 2b. In this embodiment, the lithium blocking layer 6 is deposited with chromium by the electron-beam vapor deposition, thermal deposition, sputtering method or the like. Thereafter, the lithium blocking layer 6 corresponding to the region where the electrodes 4a and 4b will be proceed is removed by using the standard photolithography technique and etching.

Next, as shown in FIG. 11B, SiO2 is deposited thereon to form a buffer layer 3, by CVD, sputtering method or the like. Optionally, the buffer layer 3 may be annealed. Thereafter, the lithium blocking layer 6 and buffer layer 3 between the channel-type optical waveguides 2a and 2b are removed by using the standard photolithography technique and etching.

Finally, as shown in FIG. 11C, the layer for forming the electrodes 4a and 4b is deposited by the electron-beam vapor deposition, thermal vapor deposition, sputtering method or the like, thereafter forming the electrodes 4a and 4b by using the standard photolithography technique and etching. The electrodes are mainly made of gold.

Alternatively, the removing of the lithium blocking layer 6 and buffer layer 3 between the channel-type optical waveguides 2a and 2b as in FIG. 11B may be simultaneously carried out after the forming of the electrodes 4a and 4b.

From the above-mentioned process, the process for making the optical control devices i the fourth and sixth embodiments will be easily understood. Namely, after forming the directional coupler 5 of two waveguides 2a and 2b on the LiNbO3 crystalline substrate 1 by the thermal diffusion, the layer for forming the lithium blocking layer 6 is deposited. Thereafter, the lithium blocking layer 6 corresponding to the region where the electrodes 4a and 4b will be formed or the lithium blocking layer 6 corresponding to the above-mentioned region and the region between the electrodes 4a and 4b is removed. Thereafter, the buffer layer 3 is deposited thereon. Finally, similarly to the fifth embodiment, the electrodes 4a and 4b are formed on the buffer layer 3.

Figure 12:
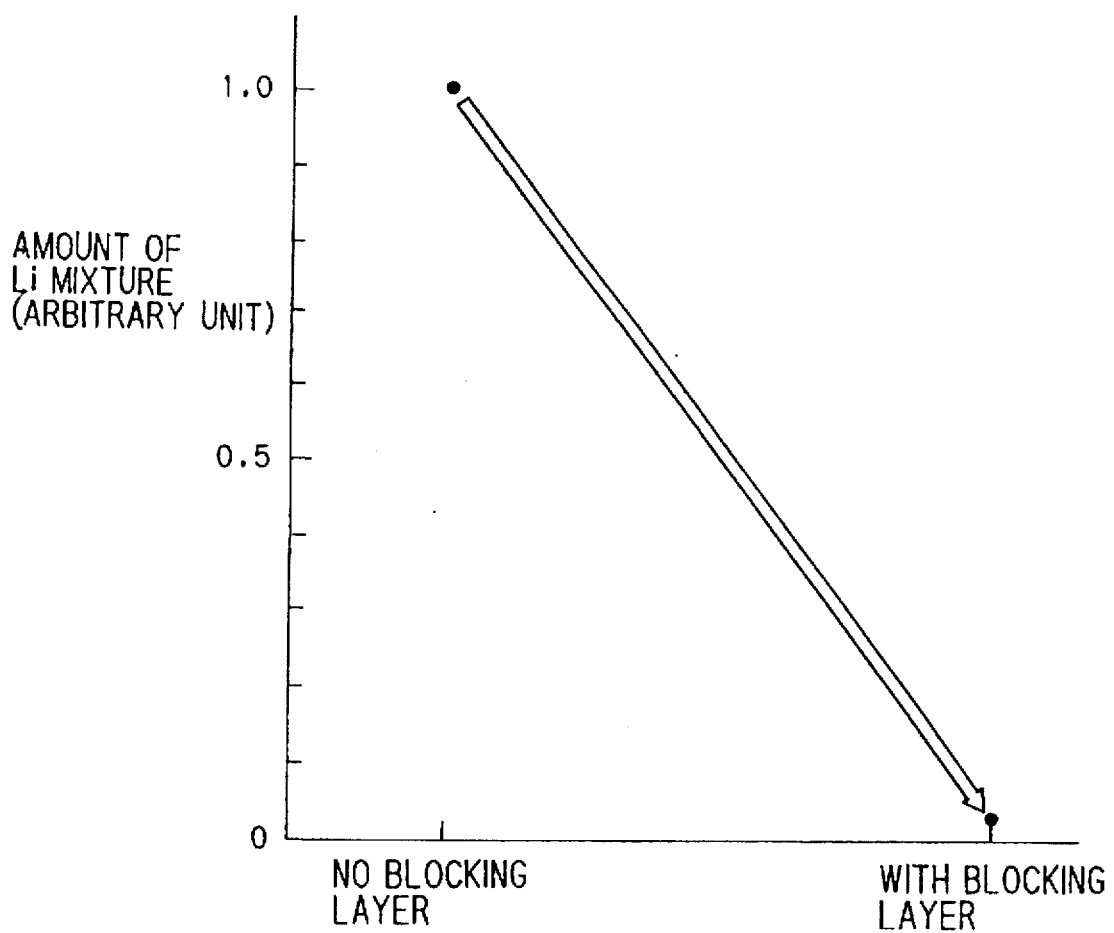
FIG. 12 is a graph showing an amount of lithium mixture into a buffer layer depending on the existence of a lithium blocking layer.

FIG. 12 shows an amount of lithium mixture into the SiO2 buffer layer 3 depending on the existence of the lithium blocking layer 6, i.e., on the right end point of the horizontal axis, the lithium blocking layer is formed on the surface of the LiNbO3 crystalline substrate 1 (in the fourth to sixth embodiments); on the left end point of the horizontal axis, the lithium blocking layer is not formed on the surface of the LiNbO3 crystalline substrate 1. The SiO2 buffer layer 3 is formed by the sputtering method. Due to the lithium blocking layer 6, the amount of lithium mixture into the SiO2 buffer layer 3 is reduced to about 1/50.

Thus, according to the optical control device, the lithium mixture from the LiNbO3 crystalline substrate 1 into the SiO2 buffer layer 3 due to plasma or heat when the SiO2 buffer layer 3 is deposited by CVD method, sputtering method, vapor deposition method or the like can be effectively reduced.

Although the invention has been described with respect to specific embodiment for complete and clear disclosure, the appended claims are not to be thus limited but are to be construed as embodying all modification and alternative constructions that may occur to one skilled i the art which fairly fall within the basic teaching here is set forth.

What is claimed is:

1. An optical control device, comprising:

a crystalline substrate comprising lithium containing material, and having electrooptic effect;

a channel-type optical waveguide which is formed in said crystalline substrate by doping metal;

an optically transparent film layer formed on said crystalline substrate; and electrodes formed on said optically transparent film layer;

wherein a layer doped by metal is formed on at least a portion of a surface of said crystalline substrate outside of a region where waveguided-light through said channel-type optical waveguide propagates.

2. An optical control device, according to claim 1, wherein:

said metal for doping said channel-type optical waveguide or said layer under said partial or entire surface of said crystalline substrate is selected from the group consisting of titanium, copper, vanadium, iron, molybdenum, chromium.

3. An optical control device, according to claim 1, wherein:

said crystalline substrate is made of LiNbO3, and said channel-type optical waveguide is formed by doping titanium.

4. An optical control device, according to claim 1, wherein:

said crystalline substrate is made of LiNbO3, and said layer under said partial or entire surface of said crystalline substrate is doped by titanium.

5. An optical control device, comprising:

a crystalline substrate comprising one of LiNbO3 and LiTaO3, and having electrooptic effect;

a channel-type optical waveguide which is formed in said crystalline substrate by proton exchange;

an optically transparent film layer formed on said crystalline substrate; and electrodes formed on said optically transparent film layer;

wherein a layer doped by metal is formed on at least a portion of a surface of said crystalline substrate outside of a region where waveguided-light through said channel-type optical waveguide propagates.

6. An optical control device, according to claim 5, wherein:

said metal for doping said layer under said partial or entire surface of said crystalline substrate is selected from a group consisting of titanium, copper, vanadium, iron, molybdenum, chromium.

7. A method for making an optical control device, comprising the steps of:

providing a LiNbO3 crystalline substrate; and forming simultaneously a channel-type optical waveguide which is formed in said crystalline substrate by doping metal, and a layer under at least a portion of a surface of said crystalline substrate outside of a region where waveguided-light is meant to propagate through said channel-type optical waveguide, said layer being formed by doping metal, using a thermal diffusion technique.

8. A method for making an optical control device, according to claim 7, wherein:

said channel-type optical waveguide and said layer are formed by doping titanium.

9. A method for making an optical control device, comprising the steps of:

providing a LiNbO3 crystalline substrate;

forming a channel-type optical waveguide in said crystalline substrate by doping metal using a thermal diffusion technique; and separately forming a layer under at least a portion of a surface of said crystalline substrate outside of a region where waveguided-light is meant to propagate through said channel-type optical waveguide, said layer being formed by doping metal, using a thermal diffusion technique.

10. A method for making an optical control device, according to claim 9, wherein:

said forming of said channel-type optical waveguide is performed sequentially wit respect to said forming of said layer.

11. A method for making an optical control device, according to claim 9, wherein:

said channel-type optical waveguide and said layer are formed by doping titanium.

12. An optical control device, comprising:

a crystalline substrate having electrooptic effect which is made of a lithium-containing material;

a channel-type optical waveguide which is formed in said crystalline substrate;

a first film layer which is optically transparent and formed on said crystalline substrate;

a second film layer which is formed between said crystalline substrate and said first film layer and is positioned in an area outside of a region where waveguided-light through said channel-type optical waveguide propagates, said second film layer being made of a material different from that of said crystalline substrate and said first film layer; and electrodes, said electrodes being formed on said first film layer.

13. An optical control device, according to claim 12, wherein:

said material of said second film layer comprises crystal doped by a dopant selected from the group consisting of phosphorus, $MgF_2$, $Si_3N_4$, WSi, GaAs, InP, or a polyamide.

14. An optical control device, according to claim 12, wherein:

said material of said second film layer is selected from the group consisting of a metal or semiconductor material of a single element including Si, Ti, Cu, V, Fe, Mo or Cr, a dielectric, metal, semiconductor or organic material.

15. An optical control device, according to claim 12, wherein:

said second film layer is only made of titanium.

16. An optical control device, according to claim 12, wherein:

said crystalline substrate is made of one of $LiNbO_3$ or $LiTaO_3$.

17. A method for making an optical control device, comprising the steps of:

providing a crystalline substrate having electrooptic effect which is made of a lithium-containing material;

forming a channel-type optical waveguide in said crystalline substrate;

forming a first film layer on said crystalline substrate so that said first film layer is positioned outside of a region where waveguide-light is meant to propagate through said channel-type optical waveguide; and forming a second film layer which is optically transparent on said second film layer.

18. A method for making an optical control device, comprising the steps of:

providing a crystalline substrate having electrooptic effect which is made of a lithium-containing material;

forming a channel-type optical waveguide in said crystalline substrate;

forming a first film layer on said crystalline substrate;

forming a second film layer which is optically transparent on said second film layer; and removing at least a part of said first and second film layers over a region where waveguided-light is meant to propagate through said channel-type optical waveguide.

* * * * *